United States Patent
Park

(10) Patent No.: US 8,495,729 B2
(45) Date of Patent: Jul. 23, 2013

(54) SYSTEM FOR AND METHOD OF AUTHENTICATING DEVICE AND USER IN HOME NETWORK

(75) Inventor: Chang-hwan Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1172 days.

(21) Appl. No.: 11/293,380

(22) Filed: Dec. 5, 2005

(65) Prior Publication Data

US 2006/0137005 A1 Jun. 22, 2006

(30) Foreign Application Priority Data

Dec. 16, 2004 (KR) ............................. 2004-106844

(51) Int. Cl.
*G06F 12/14* (2006.01)

(52) U.S. Cl.
USPC .............. 726/21; 713/155; 709/220; 709/228

(58) Field of Classification Search
USPC ........................ 726/21; 709/220, 228; 713/155
See application file for complete search history.

(56) References Cited

U.S. PATENT DOCUMENTS

| | | | |
|---|---|---|---|
| 6,857,009 B1* | 2/2005 | Ferreria et al. ................. | 709/219 |
| 6,924,727 B2 | 8/2005 | Nagaoka et al. | |
| 6,954,790 B2* | 10/2005 | Forslow .......................... | 709/227 |
| 7,346,344 B2* | 3/2008 | Fontaine ......................... | 455/418 |
| 7,500,177 B2* | 3/2009 | Humpleman et al. ......... | 715/205 |
| 7,882,207 B1* | 2/2011 | Titmuss et al. ................ | 709/223 |
| 2002/0180579 A1 | 12/2002 | Nagaoka et al. | |
| 2003/0126243 A1* | 7/2003 | Kudo et al. ..................... | 709/222 |
| 2003/0233440 A1 | 12/2003 | Nakamura et al. | |
| 2004/0133689 A1* | 7/2004 | Vasisht .......................... | 709/228 |
| 2004/0139312 A1* | 7/2004 | Medvinsky ................... | 713/150 |
| 2004/0242197 A1* | 12/2004 | Fontaine ........................ | 455/411 |
| 2004/0260786 A1* | 12/2004 | Barile ............................ | 709/217 |
| 2005/0089010 A1* | 4/2005 | Rue et al. ...................... | 370/349 |

(Continued)

FOREIGN PATENT DOCUMENTS

| | | |
|---|---|---|
| CN | 1393092 A | 1/2003 |
| CN | 1481120 A | 3/2004 |

(Continued)

OTHER PUBLICATIONS

Office Action issued Apr. 22, 2010) by the State Intellectual Property Office of PR China in Chinese Patent Application No. 200510132002.7.

*Primary Examiner* — Kambiz Zand
*Assistant Examiner* — Tongoc Tran
(74) *Attorney, Agent, or Firm* — Sughrue Mion, PLLC

(57) ABSTRACT

A system for authenticating a device and a user in a home network. The home network manages one or more devices through a home server. The system includes a service device for providing service contents according to the control of a control device. The system includes a home server for containing authentication information for the respective devices. The home server performs a network configuration for the respective devices according to the authentication information. A permission server is connected with the home server. The permission server contains service permission information according to the characteristics of the respective control devices. The control device performs a network authentication through the home server, and is provided with service contents from the service device according to whether the permission server allows the requested service contents. The system can perform an authentication procedure and a network configuration for the control devices.

21 Claims, 14 Drawing Sheets

U.S. PATENT DOCUMENTS

| | | | |
|---|---|---|---|
| 2005/0144262 A1* | 6/2005 | Kang et al. .................... | 709/220 |
| 2005/0197965 A1* | 9/2005 | Takabayashi et al. .......... | 705/59 |
| 2006/0080380 A1* | 4/2006 | Aizu et al. .................... | 709/203 |
| 2006/0146742 A1* | 7/2006 | Kawahara et al. ............. | 370/328 |
| 2006/0155984 A1* | 7/2006 | Tsuchida et al. .............. | 713/156 |
| 2006/0174310 A1* | 8/2006 | Lee et al. ...................... | 725/135 |
| 2006/0218158 A1* | 9/2006 | Stuhec et al. ................. | 707/100 |
| 2006/0259583 A1* | 11/2006 | Matsuura ....................... | 709/218 |
| 2007/0101381 A1* | 5/2007 | Furlong et al. ................ | 725/105 |
| 2007/0165591 A1* | 7/2007 | Higure et al. ................. | 370/346 |

FOREIGN PATENT DOCUMENTS

| | | |
|---|---|---|
| JP | 2002-026954 A | 1/2002 |
| JP | 2003-196179 A | 7/2003 |
| JP | 2003-283589 A | 10/2003 |
| JP | 2003-303174 A | 10/2003 |
| JP | 2004-021666 A | 1/2004 |
| KR | 10-0263894 B1 | 5/2000 |
| KR | 10-2003-0073807 A | 9/2003 |
| KR | 10-2004-0048815 A | 6/2004 |

* cited by examiner

FIG. 11A

| MAC : M3 | Device ID : PDA | User ID : | PW : |

| MAC : M3 | Device ID : PDA | User ID : Guest 2 | PW : **** |

1100, 1110, 1140, 1150

SYSTEM FOR AND METHOD OF AUTHENTICATING DEVICE AND USER IN HOME NETWORK

This application claims priority from Korean Patent Application No. 2004-106844 filed on Dec. 16, 2004 in the Korean Intellectual Property Office, the entire content of which is incorporated herein by reference.

BACKGROUND OF THE INVENTION

1. Field of the Invention

Systems and methods consistent with the present invention relate to authenticating a device and a user in a home network, and more specifically, to authenticating a device and a user, wherein each device and each user are authenticated while differentiating access priority.

2. Description of the Related Art

A home network is a network connecting information technology home electronic devices within a home such that the devices can be used whenever and wherever required. In particular, digital devices such as Internet-operable refrigerators, washers, digital televisions (TVs), digital camcorders, cameras, computers, air-conditioners, and the like are connected to the home network. Currently, wired or wireless communication techniques are both employed as transmission techniques. Recently, wireless techniques that have been intensively researched include home radio frequency (RF), Bluetooth, wireless local area network (LAN), IrDA using infrared rays, and so forth.

On the other hand, in a home network, during data communications between devices or between a server and a device, a receiver needs to confirm and authenticate whether a message from a sender is legitimate and if the transmitter is a legitimate user. In addition, in a communication between the server and the devices, each device first needs to be registered and authenticated in order to perform normal communications with a server. Currently, various authentication methods are considered for inter-communication.

A common home network system is composed of at least one device and a home server administering the devices. Here, the device may be home electronics, for example, a washer, a refrigerator, an air-conditioner, a TV, an audio system, and so on. At this time, the home server and the devices can be connected to each other through a wired or wireless communication means, and the respective devices can be controlled through the communication between the server and the devices.

On the other hand, the home server and each device may be connected with each other through a wired line, but recently a wireless communication has been considered. The wireless communication means may be exemplified by a wireless LAN, Bluetooth, infrared communication (IrDA) and the like.

As described above, in order to control devices in a home server, when the device is originally installed, it needs to be registered with the home server. In a case where the home server and the device are in wireless communication, data security and device authentication are needed. That is, in a wireless environment, device authentication is a basic and inevitable security service for determining if each device is legitimate in permitting access to the server.

A conventional home network authentication method includes a ticket (or token) system, an access control list (ACL) technique, a dynamic host configuration protocol (DHCP) method, a point-to-point protocol over Ethernet (PPPoE) method, auto Internet protocol (IP) configuration (no authentication) and the like.

First, the ticket (or token) system designates several types of ownership for access rights to a transmission service. At this time, a user must acquire a ticket from the administration system before being provided with a service (that is, having access). However, the ticket system has a drawback in that the ticket administration and application are difficult.

In the ACL technique, access rights are differentiated through an access list for users. However, this method does not provide a connection between the device and the user, thus leading to difficulty in the administration thereof. The DHCP method employs an authentication algorithm in addition to the DHCP protocol. However, the key distribution is difficult, and the communication protocol between two devices (that is, a client and a server) is not compatible.

The PPPoE authentication is an external access network authentication method, and uses a PPP link and a PPP protocol over Ethernet. However, it inherently includes disadvantages in that it has processing overhead through source routing and additional packet headers.

On the other hand, in the auto IP configuration or a network configuration not requiring authentication where no authentication is processed, anyone has a use right without restriction, but it may cause problems such as an invasion of privacy.

Therefore, there is a need to provide an effective authentication method for a user and a device for the construction of an efficient home network.

SUMMARY OF THE INVENTION

The present invention provides a system for and a method of authenticating a device and a user in a home network, in which, when a user wishes to have access to a service and a device within the home network, authentication for the user and the device can be performed simultaneously.

The present invention also provides a system for and a method of authenticating a device and a user in a home network, in which access permission for each contents in the home network can be provided with respect to each user or each device.

The present invention also provides a system for and a method of authenticating a device and a user in a home network, in which a DHCP server and a PPPoE server can be included together in a home server, thereby enabling effective authentication for a variety of devices.

The present invention also provides a system for and a method of authenticating a device and a user in a home network, in which an authentication procedure and a network configuration procedure for each device and user can be carried out simultaneously in the home network.

According to an aspect of the present invention, there is provided a system for authenticating a device and a user in a home network, in which one or more devices are managed through a home server, the system comprising: a service device for providing service contents according to the control of a control device; a home server for containing authentication information for the respective devices and performing a network configuration for the respective devices according to the authentication information; a permission server connected with the home server and containing service permission information according to the characteristics of the respective control devices; and the control device performing a network authentication through the home server, and being provided with service contents from the service device according to whether the permission server allows the requested service contents.

The permission server may include a device and permission list database, which manages, in the form of a table, the service permission information according to the characteristics of the respective control devices.

Here, the device and permission list database may further include service device permission information according to the characteristics of the respective control devices.

The home server may include an authentication table for storing authentication information for the respective devices, the authentication information being mapped to the respective device.

Authentication for each control device in the home server is performed using media access control address information of the control device. In the home server, authentication for the respective control device is performed through a user identifier (ID) and password.

The home server can simultaneously process user authentication, device authentication and network configuration for the control device. The home server can simultaneously process a DHCP packet and a PPPoE packet from the control device.

The home server includes: an Ethernet type check module for checking the data type of an incoming packet from the control device having requested a network configuration; a PPPoE server performing PPPoE processing according to the data type confirmed in the Ethernet type check module; a DHCP server performing a DHCP processing according to the data type confirmed in the Ethernet type check module; and a user/device authentication database for performing user and device authentication after the PPPoE processing and the DHCP processing.

Here, the PPPoE server may include: a PPPoE daemon performing processing in accordance with a PPPoE processing request; a PPP daemon performing processing in accordance with a PPP processing request, after the PPPoE daemon processing; and a user authentication module in charge of user authentication in the PPPoE, after the PPP daemon processing.

In addition, the DHCP server may include: a DHCP port number check module for checking a port number for a DHCP packet; a DHCP daemon performing processing in accordance with a DHCP processing request; after the DHCP port number check; and a media access control (MAC) address authentication module for authenticating the MAC address of the DHCP packet, after the DHCP daemon processing.

The Ethernet type check module confirms Ethernet-type information-containing field among the data fields of the incoming packet data, and determines through information recorded in the field whether the incoming data packet is a DHCP packet or a PPPoE packet.

Here, in a case where the Ethernet type of the incoming data packet is confirmed as being DHCP in the Ethernet type check module, IP packet information is confirmed through an IP packet area of a payload. In a case where the Ethernet type of the incoming data packet is confirmed as being DHCP in the Ethernet type check module, user data protocol (UDP) information is confirmed through an IP packet area of a payload.

In the home server, the DHCP daemon of the DHCP server and the PPPoE daemon of the PPPoE server are capable of simultaneously connecting to an IP pool database containing allocatable IP information.

According to another aspect of the invention, there is provided a method of authenticating a device and a user in a home network, the method comprising: authenticating a user and a control device through a home server, the user and the control device intending to control various service devices within the home network and to be provided with a service from the service devices; making a request for a service of the service device, the service request being made by the control device toward the homer server; in response to the service request, providing a service permission for the requested service to the control device through a permission server interlocked with the home server; and after the service permission, providing the requested service to the control device from the service device.

Here, when the control device is connected to the home network, the method may further comprise: registering the control device with an authentication table of the home server; transmitting a service permission registration message to the permission server by means of the home server; registering permission information for the control device with the permission serer by means of the permission server; requesting a service provision of the service device to the home server by means of the control device; confirming through the permission server by means of the home server whether the service provision requested by the control device is an allowed service; and if allowed as the result of the confirmation, providing from the service device the service requested by the control device.

In addition, when the requested service is allowed, the method further comprises: selecting a matching protocol, port and format from among the home server, the control device, and the service device providing requested media contents; and updating a routing table and a bridging table between the control device and the service device by means of the home server.

The permission server manages service permission information in a table form according to the characteristics of each control device. The permission server may further contain service device permission information according to the characteristics of each control device.

The home server contains an authentication table, in which authentication information for each device is stored with mappings to each device.

Here, authentication for each control device in the home server may be performed using a media access control address information of the control device, or using a user ID and password information.

The home server can simultaneously process user authentication, device authentication and network configuration for the control device. In addition, the home server is capable of simultaneously processing a DHCP packet and a PPPoE packet from the control device.

In a case where the requested service is not allowed, the method further comprises: transmitting a service permission reject message from the permission server to the home server, in response to the service permission request message of the homer server; and transmitting a reject message to the control device from the home server having received the service permission reject message from the permission server.

According to another aspect of the invention, there is provided a method of authenticating a device and a user in a home network, the method comprising: requesting a network configuration to a home server from a control device; confirming a protocol of an incoming packet transmitted by the control device; as the result of the confirmation, in the case of DHCP, confirming whether an MAC address of the control device is registered with an authentication table; as the result of the confirmation, in a case where the MAC address is registered with the authentication table, allocating an IP address to the control device; completing the network configuration of the control device with the home server; registering information on the service permission of the control device with a permission table; after the service request of the control device, determining whether the requested service is allowed in the permission table; and as a result of the determination, if the requested service is allowed, providing the requested service.

Here, as a result of the confirmation of the registration with the authentication table, in a case where the MAC address is not registered with the authentication table, the method further comprises recognizing the control device as a guest device and again requesting a network configuration.

According to another aspect of the invention, there is provided a method of authenticating a device and a user in a home network, the method comprising: requesting a network configuration to a home server, the request being made by a control device; confirming a protocol of an incoming packet transmitted by the control device; as a result of the confirmation, if confirmed as a PPPoE, confirming whether an MAC address of the control device is registered with an authentication table; as a result of the confirmation, if registered, performing a network configuration to the control device by means of a PPPoE daemon; registering information related to a service permission of the control device with a permission table; after the service request of the control device, determining whether the requested service is allowed in the permission table; and as a result of the determination, if the requested service is allowed, providing the requested service.

Here, as a result of the confirmation as to the registration with the authentication table, in a case where the MAC address is not registered with the authentication table, the method further comprises registering the MAC address of the control device with the authentication table.

According to another aspect of the invention, there is provided a method of authenticating a device and a user in a home network, the method comprising: requesting a network configuration to a home server, the request being made by a control device; confirming an auto IP configuration for the control device; as a result of the confirmation, if confirmed as an auto IP configuration, confirming whether an MAC address of the control device is registered with an authentication table; as a result of the confirmation, if registered, completing a network configuration; registering information related to service permission of the control device with a permission table; after the service request of the control device, determining whether the requested service is allowed in the permission table; and as a result of the determination, if the requested service is allowed, providing the requested service.

Here, the method further comprises: as a result of the confirmation, in a case where the MAC address is not registered with the authentication table, confirming whether a PPPoE client module exists in the control device; and as a result of the confirmation, in a case where the PPPoE client module exists, performing a network configuration to the control device by means of a PPPoE daemon. The method may further comprise: as a result of the confirmation, in a case where the PPPoE client module does not exist, transmitting a PPPoE client file to the control device; and executing the received PPPoE client file and generating the PPPoE client module by means of the control device.

According to the present invention, a user authentication, a device authentication, and a network configuration for a guest device are processed simultaneously in the home network. In addition, the invention proposes a home server and a user authentication capable of supporting both the DHCP and the PPPoE protocols.

On the other hand, according to the invention, authentication for an in-home legacy device is performed through a hardware MAC address, and authentication for a temporarily visiting device is performed through a user ID and password.

In addition, all the guest devices can have access to various devices and services within the home network, necessarily through the home server of the invention. At this time, the guest devices passing through the home server may be set up differently for the devices and services inside the home, depending on the designated user ID and password.

In the conventional common universal plug and play (UPnP), the IP configuration does not include authentication for the user and the device, but in the present invention, an authentication for the device and the user can be carried out.

Furthermore, according to the invention, the device and user, which have passed the authentication and established a network configuration, are given a traffic priority for efficient job scheduling, thereby enabling an efficient provision of quality of service (QoS).

BRIEF DESCRIPTION OF THE DRAWINGS

The above and/or other aspects of the present invention will be more apparent by describing certain exemplary embodiments of the present invention with reference to the accompanying drawings, in which:

FIGS. 11A and 11B are diagrams showing an information configuration for the guest device according to an exemplary embodiment of the invention;

DETAILED DESCRIPTION OF EXEMPLARY EMBODIMENTS OF THE INVENTION

Certain exemplary embodiments of the present invention will be described in greater detail with reference to the accompanying drawings.

Figure 1:
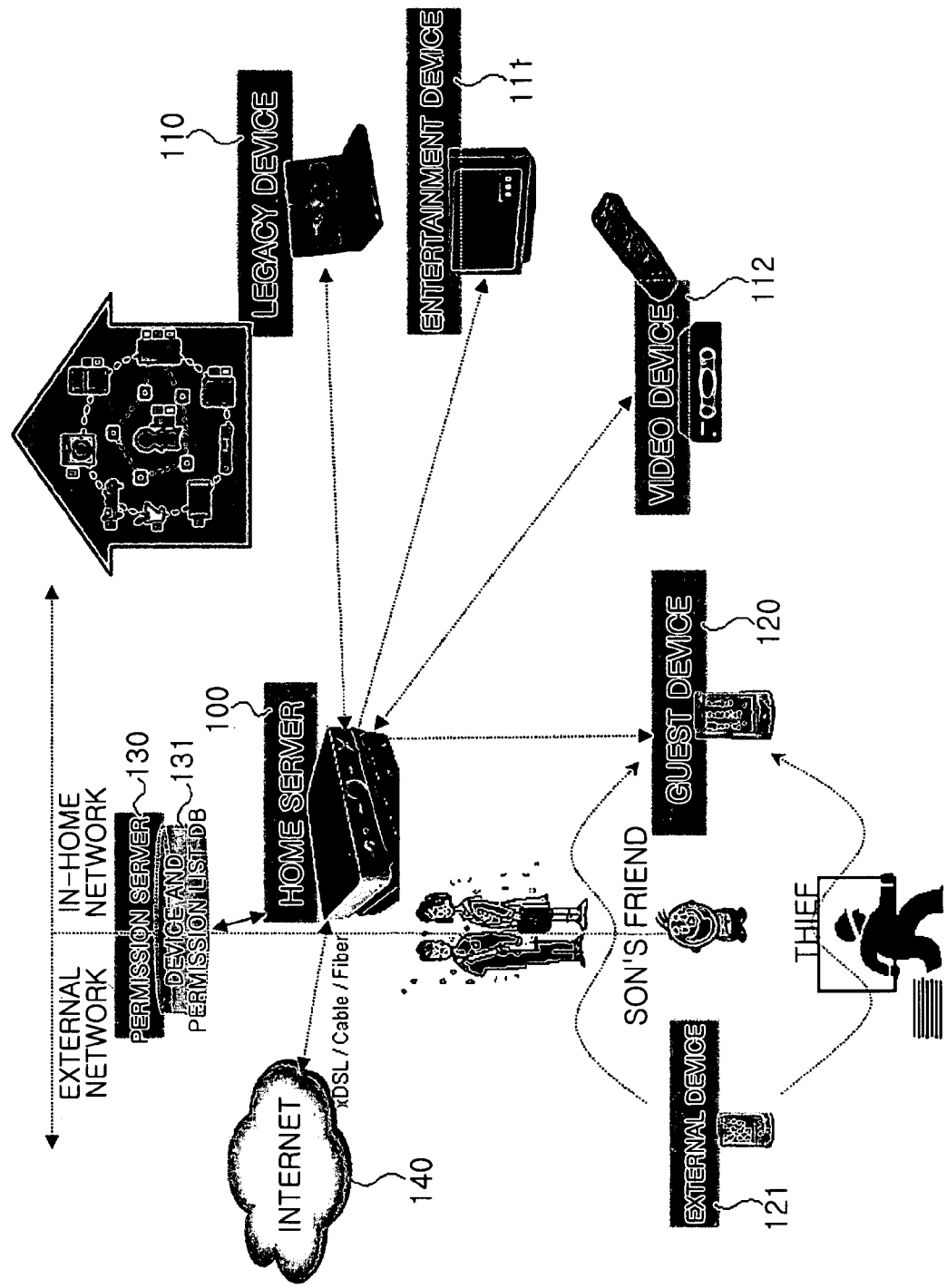
FIG. 1 shows a home network to which the present invention can be applied.

FIG. 1 shows a home network to which the present invention can be applied. Referring to FIG. 1, within the home network, a legacy device 110 or a guest device 120 can communicate with one or more devices (for example, an entertainment device 111, a video device 112, etc.) through a home server 100. Here, the legacy device 110 means a device already-installed within the home network, and the guest device 120 means a device that temporarily visits the home network, such as an external device 121.

On the other hand, any device can be introduced and used inside the home network, but must pass an authentication process. At this time, according to the invention, a user authentication process is carried out with respect to the legacy device 110 or the guest device 120, using the PPPoE mode or the DHCP mode. Through this process, differentiation for contents and services can be embodied.

For example, in the case where a guest visits and has access to the home network, it is preferable that not all the materials within the home network are open to the guest. In addition, in the case of a son's friend, an access limitation for adult contents is preferred to be setup. Furthermore, when a thief breaks in, any device and any service within the home network must be established to be inaccessible. Thus, in the present invention, a control device (i.e., the legacy device 110 or the guest device 120), which controls service devices for providing various services within the home network (for example, the entertainment device 111, the video device 112, etc.), performs the authentication process through the home server 100. At this time, permission for the services and the service devices can be established through the home server 100 so as to be differentiated, depending on the respective control devices.

The home server 100 may include a gateway function for connecting with an external network such as the Internet 140, or may perform a communication with the external network through a separate gateway (not shown) installed outside of the home server 100. Here, the home server 100 may be connected to the Internet 140 through a communication means such as xDSL, cable or optical communications, or the like.

On the other hand, according to the present invention, the home network includes a permission server 120, which is cooperated with the home server 100. The home network can control, through the permission server 130, the device and service permission for various control devices to be connected to the home server 100. Thus, the permission server 130 may be configured such that the device and permission list database 131 contains permission information for each individual control device made in a permission table form. That is, in order to control various service devices within the home network, each control device is connected to the permission server 130 through the home server 100 and can be given a permission for each service device and service through the permission table of its own, which is contained in the device and permission list database 131 of the permission server 130. On the other hand, the permission server 130 may be included in the home server 100, or may be constituted in an external network through the Internet 140.

Hereafter, the function of the home server 100 will be described in greater detail, referring to FIG. 2.

Figure 2:
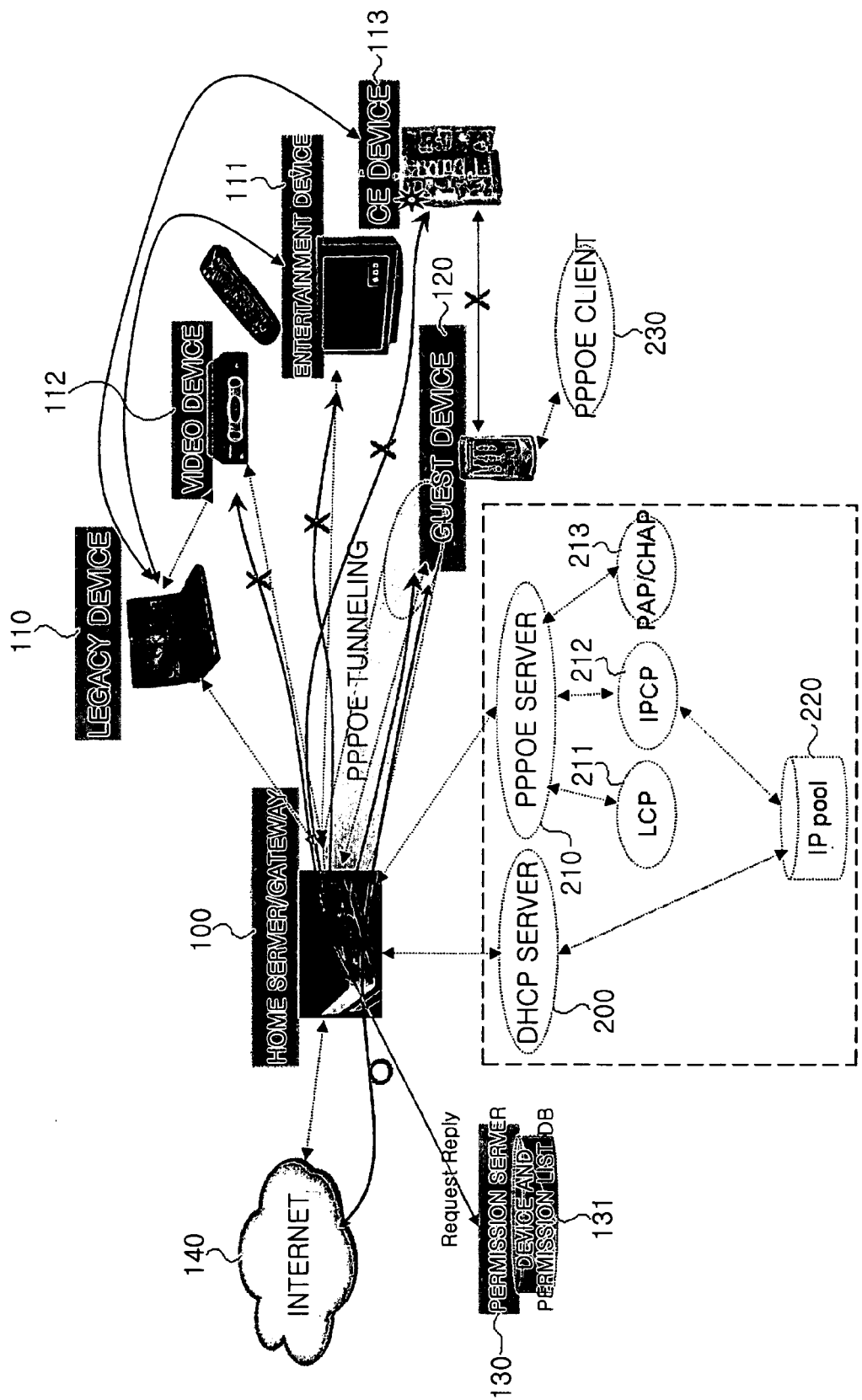
FIG. 2 illustrates a device and user authentication system in a home network according to the invention.

FIG. 2 illustrates a device and user authentication system in a home network according to the invention. Referring to FIG. 2, as described above, the legacy device 110, which is one of the control devices already-established within the home network, is able to control each service device (for example, the video device 112, the entertainment device 111, a consumer electronic device 113, etc.) through the home server 100 of the invention. Alternatively, the legacy device 110 may be configured so as to directly control the service devices without going through the home server 100.

However, preferably, but not necessarily, the guest device 120 is configured such that, after going through an authentication and permission process through the home server 100, it can control various service devices according to the permission level, without directly controlling the service devices.

That is, when a new guest device 120 wishes to connect to the home network in order to control the service devices or be given a service from the service devices, it must first establish a network connection through the home server 100 and then pass the authentication process. In addition, according to the invention, the guest device 120 is provided, through the permission server 130, with a service from the service devices according to the permission level or the information on the allowed service types, which are established in the device and permission list database 131 of the permission server 130. At this time, in a case where the permission server 130 is separately installed outside the home server 100 within the home network, the guest device 120 can connect to the permission server 130 through the home server 100.

The permission table contained in the device and permission list database 131 is exemplified by Table 1.

TABLE 1

| ID | MAC address | Permission information |
|---|---|---|
| guest 1 | M1 | All permitted |
| guest 2 | M3 | Just image & movie & Internet & not adult |
| guest 3 | M5 | Just device |
| guest 4 | M6 | Just Internet |

Referring to Table 1, each guest device 120 contains permission information conforming to the characteristics of the device (i.e., relationship, level, etc.), and services and device controls are provided or allowed in a limited fashion according to the permission information. At this time, the identification for each device is performed through the confirmation of the MAC address of the device.

For example, if the guest 1 is a master control device, it can be set up to allow use of all the devices. If the guest 2 is a son's control device, it can be set up to control images, movies, or the Internet, so as to prohibit access to adult content. In addition, the guest 3 can be set up to control each service device, or the guest 4 can be set up to use only the Internet. In this way, according to the invention, the permission server 130 is provided with a device and permission list database 131, and thus each control device can be set up for the permission level for services with the home network, conforming to the properties of each device.

On the other hand, the home server is configured to support DHCP and PPPoE such that a network connection can be carried out, regardless of the communication protocol type of the legacy device 110 or the guest device 120.

Thus, according to an exemplary embodiment of the invention, the home server 100 includes the DHCP server 200 and the PPPoE server 210. At this time, the DHCP server 200 provides an inherent IP address for network connection to the concerned control device through an IP pool database 220. In addition, the PPPoE server 210 provides an inherent IP address for network connection through the IP pool database 220, by means of an IPCP (IP Control Protocol) 212, which is an IP-providing protocol.

Furthermore, the PPPoE server 210 establishes a data link through an LCP (Link Control Protocol) 211 for the purpose of a network connection by the PPPoE. The authentication is performed by a Password Authentication Protocol/Challenge Handshake Authentication Protocol (PAP/CHAP) 213. At this time, the PAP/CHAP 213 performs an authentication process through an authentication table, which is established for each control device according to an exemplary embodiment of the invention.

The authentication table is exemplified by the following Table 2.

TABLE 2

| User ID | MAC address | Device ID | IP | State |
|---------|-------------|-----------|-----|-------|
| Family  | M1          | PC_A      | I1  | On    |
| Parents | M2          | TV_A      | I2  | Off   |
| Guest2  | M3          | PDA       | I3  | On    |
| ...     |             |           |     |       |

Referring to Table 2, the authentication table for performing an authentication process within the home server 100 according to the invention may includes an MAC address, a device ID, an IP address, state information, and the like, with respect to each control device.

On the other hand, when the guest device 120 establishes a PPPoE network connection through the PPPoE server 210 of the home server 100, the guest device 120 is operated as a PPPoE client 230.

Thus, if the ID of a guest device 120 is "guest2", the MAC address of the device is "M3", and a network configuration through the PPPoE is allowed, the guest device 120 is allocated with a network configuration and IP address through the PPPoE server 210 of the home server 100 according to the invention. Therefore, PPPoE tunneling is formed between the guest device 120 and the home server 100. At this time, through the MAC address of the guest device 120, the authentication table of Table 2 is confirmed, and the IP address allocation and state setup are performed. In addition, according to the invention, the established permission device and service of the guest device 120 is confirmed through the permission table such as Table 1, which is stored in the device and permission list database 131 connected to the home server 100. At this time, the MAC address of the guest device 120 may be used in the permission procedure for the guest device 120.

Figure 3:
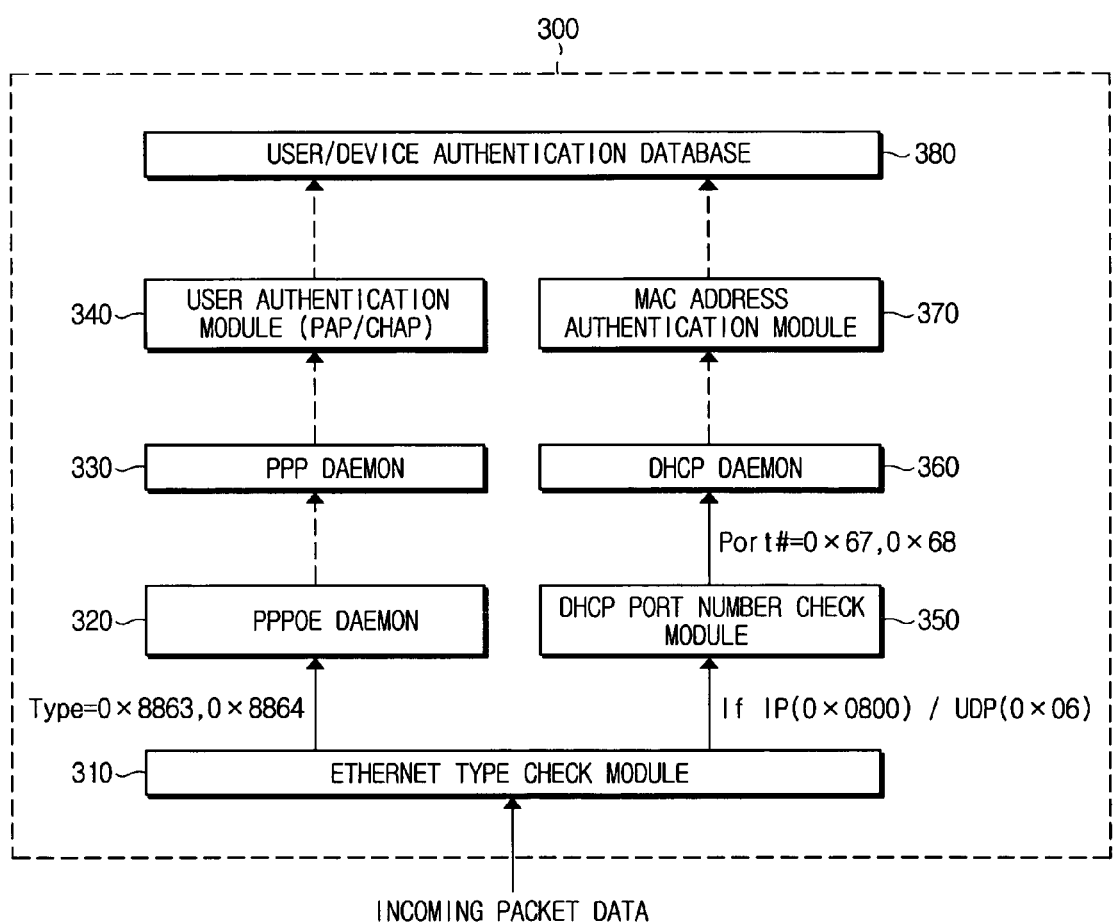
FIG. 3 is a block diagram illustrating the functional structure of a home server in the home network system according to an exemplary embodiment of the invention.
Figure 4:
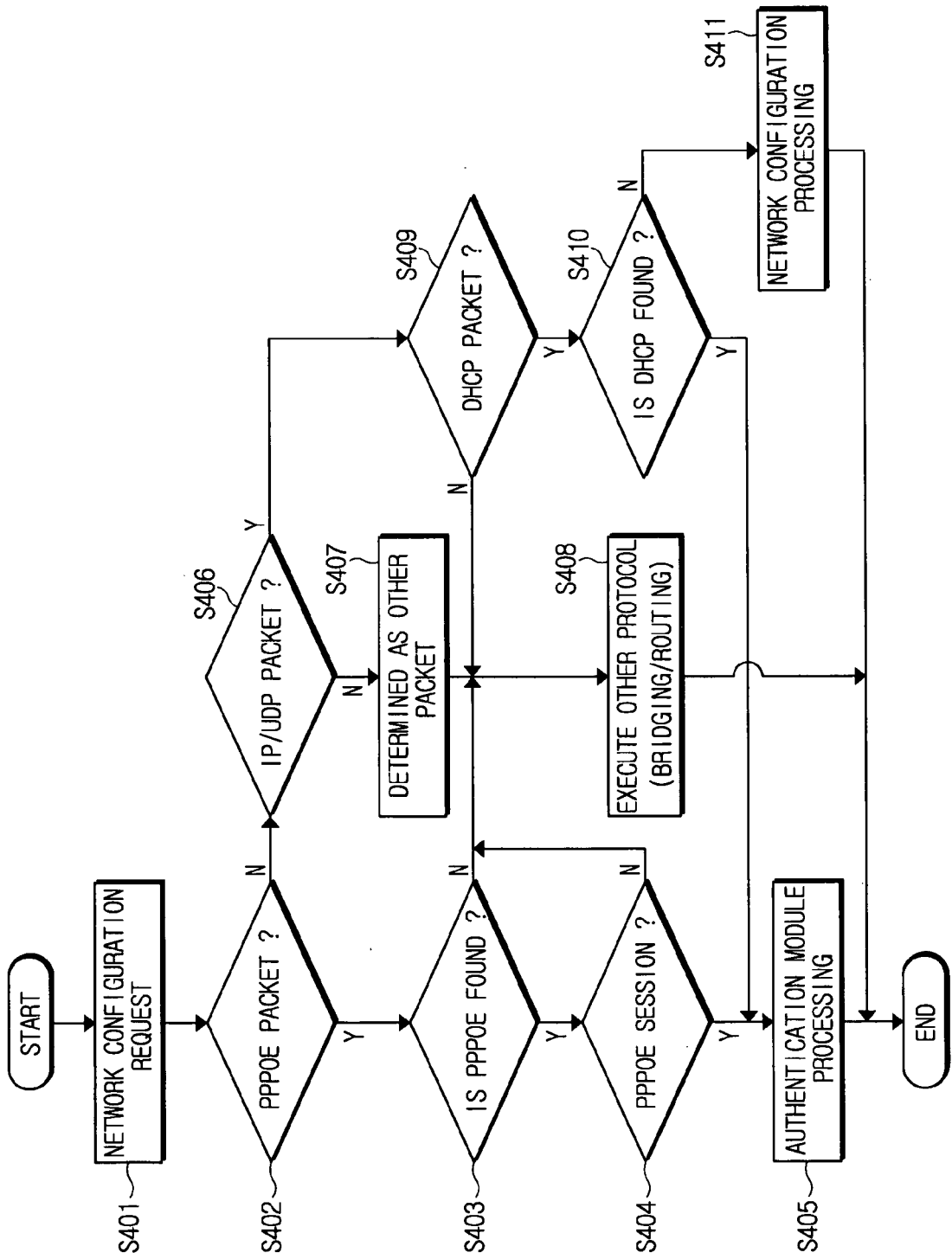
FIG. 4 is a flow chart showing a procedure of selecting a protocol in the home server according to an exemplary embodiment of the invention.
Figure 5:
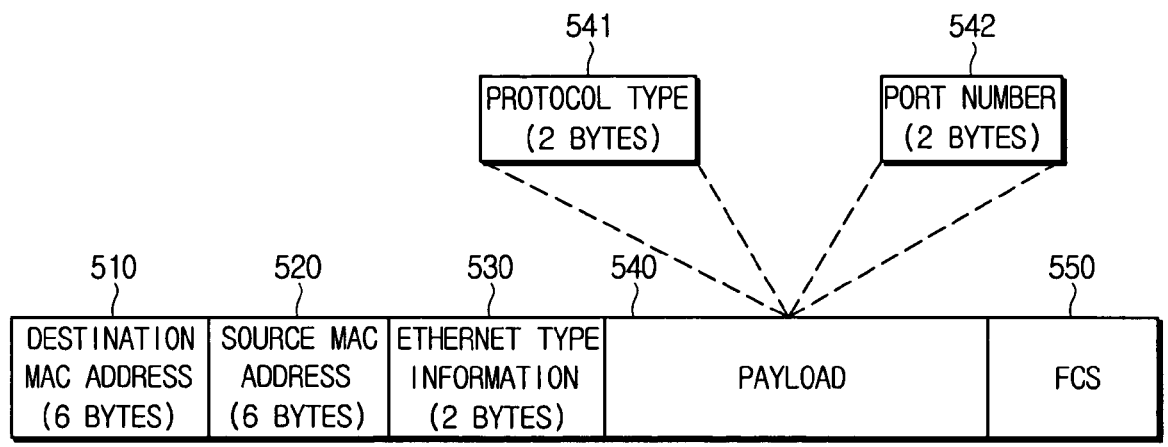
FIG. 5 is a schematic block diagram of the structure of an Ethernet packet according to an exemplary embodiment of the invention.

Hereafter, the network setup function in the home server 100 according to the network setup mode of each device will be specifically explained, referring to FIGS. 3 to 5. Here, as described above, the home server 100 according to the invention can be configured so as to support DHCP and PPPoE simultaneously.

FIG. 3 is a block diagram illustrating the functional structure of a home server in the home network system according to an exemplary embodiment of the invention. Referring to FIG. 3, the functional structure 300 of the home server 100 includes an Ethernet-type check module 310, a PPPoE daemon 320, a PPP daemon 330, a user authentication module (PAP/CHAP) 340, a DHCP port number check module 350, a DHCP daemon 360, an MAC address authentication module 370, a user/device authentication database 380, and the like.

That is, the home server 100 according to an exemplary embodiment of the invention comprises the PPPoE daemon 320, the PPP daemon 330 and the user authentication module (PAP/CHAP) 340, which includes a PPPoE server 210 capable of performing PPPoE processing according to the incoming data packet type checked in the Ethernet-type check module 310. Also, the home server 100 comprises the DHCP port number check module 350, the DHCP daemon 360 and the MAC address authentication module 370, which include a DHCP server 200 capable of performing DHCP processing. In addition, after each of the above PPPoE and DHCP processing, a user and device authentication process is carried out through the user/device authentication database 380 according to the present invention.

The Ethernet type check module 310 examines the Ethernet type of an incoming data packet. If the Ethernet type of the checked incoming data packet is a PPPoE, the data is processed through the PPPoE daemon 320, the PPP daemon 330 and the user authentication module 340. In a case where the Ethernet type is a DHCP, it is processed through the DHCP port number check module 350, the DHCP daemon 360 and the MAC address authentication module 370.

More specifically, the Ethernet type check module 310 checks a field containing Ethernet type information (generally, composed of two bytes) among the data fields of the incoming data packet, and, according to information recorded in the field, determines whether the incoming data packet is a DHCP packet or a PPPoE packet.

At this time, generally, the incoming data packet is configured as illustrated in FIG. 5. FIG. 5 is a schematic diagram showing the structure of an Ethernet packet according to an exemplary embodiment of the invention. Referring to FIG. 5, the typical incoming data packet to be inputted into the home server 100 includes a destination MAC address 510 of six bytes, a source MAC address 520 of six bytes, Ethernet type information 530 of two bytes, a payload 540, a frame check sequence 550, and the like. In addition, the payload 540 may include a protocol type 541 of two bytes and a port number type 542 of two bytes.

Thus, the Ethernet type check module 310 checks the Ethernet type information 530 among the fields of the incoming data packet and determines if the incoming data packet is a DHCP packet or a PPPoE packet.

On the other hand, if the incoming data packet is a DHCP packet, generally the payload is allocated with an IP area of twenty bytes, which includes a protocol number information of two bytes. In contrast, if the incoming data packet is a PPPoE packet, generally the payload 540 is allocated with a PPPoE area of six bytes, along with the IP area.

That is, the Ethernet type check module 310 checks the Ethernet type information 530 of the incoming data packet. If the Ethernet type information is "0x8863" or "0x8864", the incoming data packet is determined to be a PPPoE packet. PPPoE packet processing is performed through the PPPoE daemon 320, the PPP daemon 330, and the user authentication module (PAP/CHAP) 340.

As a result of the check in the Ethernet type check module 310, if the Ethernet type of the incoming data packet is DHCP, it checks the IP packet information (0x0800) and the UDP information (0x06) through the IP packet area of the payload. In addition, if the incoming data packet is composed of an IP packet and a UDP packet, the DHCP port number check module 350 confirms the port number (i.e., 0x67, 0x68) of the concerned packet through the port number area 542. Thereafter, DHCP packet processing is performed through the DHCP daemon 360 and the MAC address authentication module 370.

As described above, according to the type of the incoming data packet, a user authentication and an MAC address authentication are carried out in a PPPoE or DHCP mode. Then, according to the invention, a user and device authentication process is performed through the authentication table (as shown in Table 2) of the user/device authentication database 380.

Thus, the home server 100 of the invention is provided with the DHCP server 200 and the PPPoE server 210 simultaneously. According to the characteristics of each control device, DHCP and PPPoE processing can be performed simultaneously. In addition, as explained in connection with FIG. 2, the DHCP daemon 360 and the PPPoE daemon 320 can have access to a single IP pool database 220 at the same time.

Hereafter, referring to FIG. 4, the procedures on the network configuration of the incoming data packet will be explained, using the function structure 300 of the home server 100 in FIG. 3.

FIG. 4 is a flow chart showing a procedure of selecting a protocol in the home server according to an exemplary embodiment of the invention. Referring to FIG. 4, first, when a network configuration for an incoming data packet is requested (S401), it is checked if the incoming data packet is a PPPoE packet (S402). Then, if a PPPoE protocol is found, a PPPoE session is processed (S404) and authentication module processing of the incoming data packet is performed through the authentication module (S405). At this time, if the incoming packet is confirmed as a PPPoE packet, but the PPPoE protocol is not found, or if the PPPoE session is not processed, another protocol is executed through bridging, routing and the like (S408).

On the other hand, if the incoming data packet is not a PPPoE packet, but an IP/UDP packet, it is confirmed if the data packet is a DHCP packet (S409). After the DHCP protocol is found (S410), authentication module processing is performed (S405). At this time, in a case where the packet is confirmed as a DHCP packet, but the DHCP protocol is not found, network configuration processing is carried out (S411).

However, if the IP/UDP packet is not a DHCP packet, or if the packet is determined to be another packet, not an IP/UDP packet (S407), another protocol is executed through the bridging and routing, etc (S408).

The constitution and processing of the home server 100 according to the invention are explained as above. Hereafter, the procedure, through which the control devices 110 and 120 are authenticated through the home server 100 and then provided with a service from the service devices 111 to 113, will be explained, referring to FIG. 6 to 12.

Figure 6:
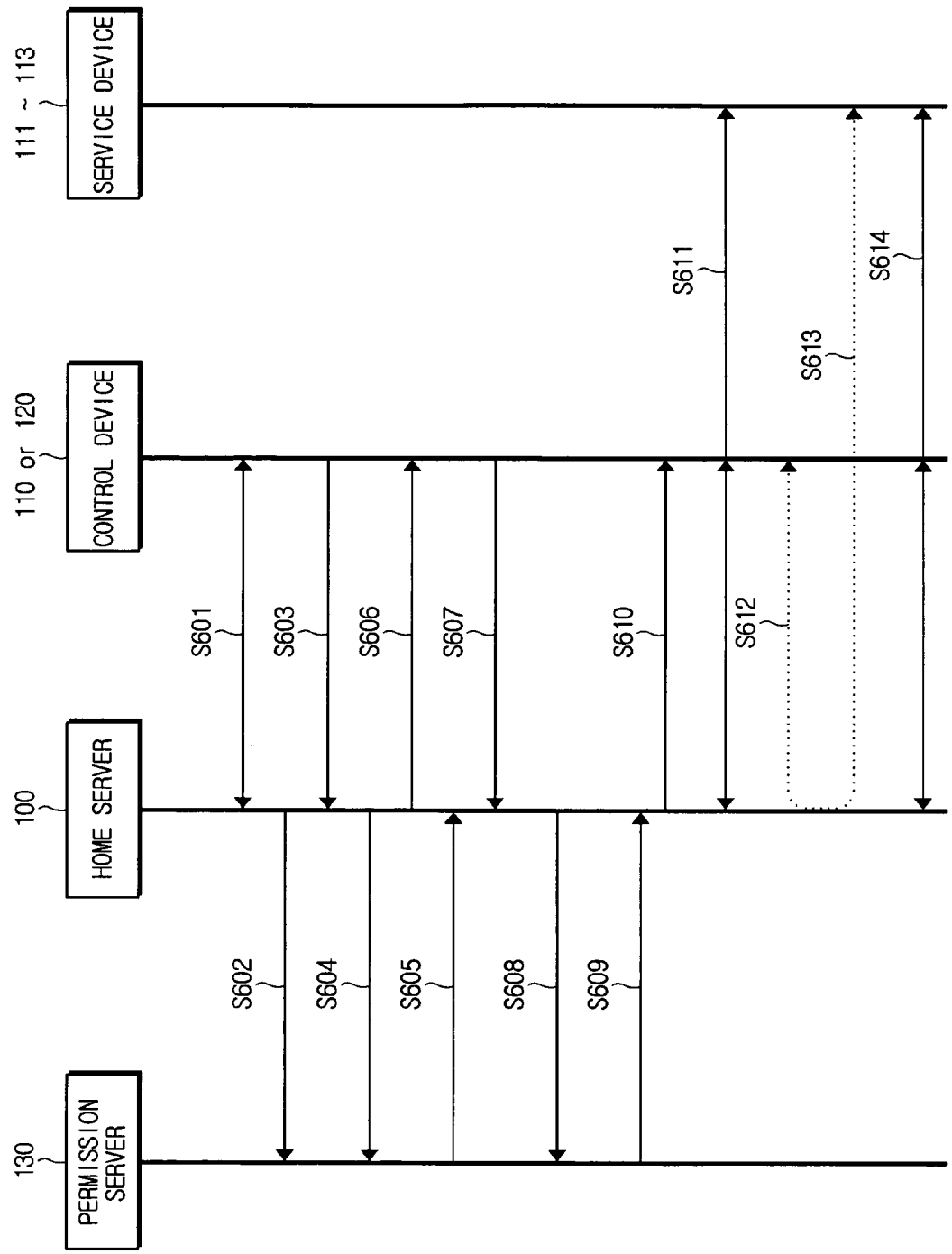
FIG. 6 is a flow chart showing the device and user authentication procedure in the home network according to an exemplary embodiment of the invention.
Figure 7:
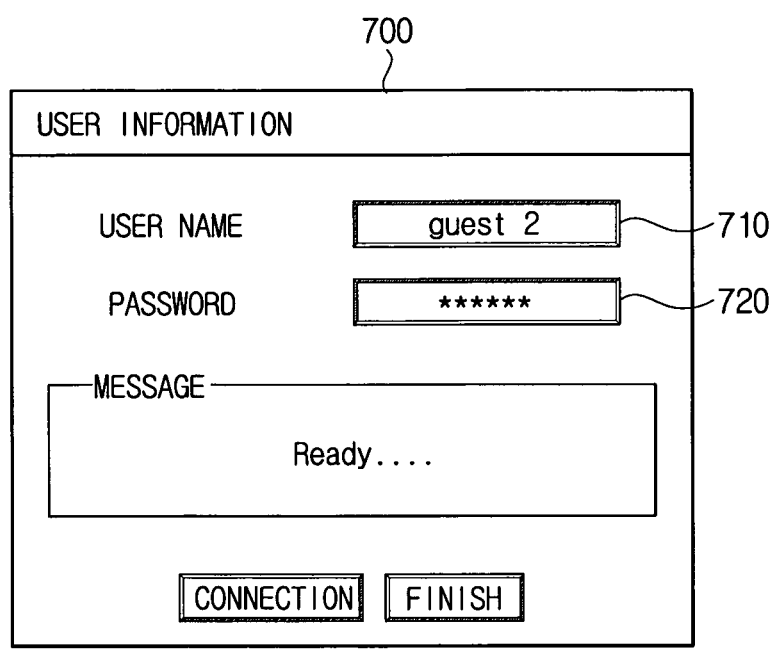
FIG. 7 illustrates a user information input window for authenticating the external device user according to an exemplary embodiment of the invention.

FIG. 6 is a flow chart showing the device and user authentication procedure in the home network according to an exemplary embodiment of the invention. Referring to FIG. 6, in order for a user to control various service devices 111 to 113 in the home network and be provided with services from the service devices 111 to 113, the user must have the control device 110 or 120 be authenticated through the home server 100 of the invention and be given a device or service permission through the permission server 130.

More specifically, first, when a control device 120, which is a UPnP media renderer, intends to newly connect to the home network, it is registered with the authentication table of the home server 100. Then, user authentication and network configuration to the home server 100 are performed (S601). At this time, in a case where the control device 120 is a guest device, authentication for the guest device is performed by inputting and transmitting the registered ID and password to the home server 100 through an input device of the control device 120, and is given an IP address, thereby completing network configuration. At this time, the information inputted into the control device 120 may be carried out as in FIG. 7. That is, referring to FIG. 7, a user information input window 700 of the control device 120 can be used to input the user name 710 and the password 720. Here, as shown at the lower end of FIG. 7, the input window 700 may output a message indicating a status as to whether the authentication is completed or being processed. Thus, the home server 100 authenticates the control device 120 through the inputted user name 710 and the password 720 information.

Thereafter, according to the invention, the home server 100 transmits a service permission register message to the permission server 130, which thereby registers the permission information for the concerned control device 120 with the permission table (e.g., Table 1) formed in the device and permission list database 131 within the permission server 130.

As described above, after the permission information for the control device 120 to access to the home network is registered, the control device 120 transmits a UPnP media request for desired media contents to the home server 100 (S603). At this time, the home server 100 confirms through the permission server 130 whether the control device 120 is an allowed device and the requested media contents are a permitted service. That is, the home server 100 transmits a service permission request message to the permission server 130 (S604).

If the user of the control device 120 is underage, it is preferable that the permission information for the control device 120, which is registered with the permission table of the permission server 130, is set up to prohibit adult content. Thus, in a case where the media content requested from the control device 120 is an adult movie image file such as "Adult.avi", the permission server 130 sends, as a response to the service permission request message, a service permission reject message to the home server 100 (S605). Then, the home server 100 receives the service permission reject message and transmits a reject message to the concerned control device 120 (S606).

On the other hand, the control device 120 may again request other media content services of the home server 100 (S607). Then, as described above, the home server 100 transmits a service permission request message to the permission server 130 (S608). If the media content requested again is a video image authorized for underage users such as "Princess.mpg", and service provision for the movie image is determined to be permitted for the control device 120, the permission server 130 sends to the home server 100 a service permission allowance message for the service permission request (S609). Thus, the home server 100 receives the service permission allowance message from the permission server 130 and sends an acknowledgement message to the relevant control device 120 to the effect that the requested media is service-allowable.

At this time, a selection procedure is performed in order to select a matching protocol, port and format from among the home server 100, the control device 120, and the relevant service device 111 to 113 for providing, for example, the requested media content (S611). Thus, the home server 100 updates the routing table and the bridging table between the control device 120 and the service device 111 to 113.

Thereafter, the home server 100 transmits the requested media contents (i.e., Princess.mpg file) to the control device 120 (S612), and renders the relevant service device 111 to 113 to reproduce the requested media contents (i.e., "Princess.mpg" file) (S613).

Finally, the control device 120 transmits the requested media contents to the service device 111 to 113 to reproduce it (S614), thereby ultimately completing all the service provision procedures.

Hereafter, referring to FIGS. 8 to 12, the above service provision procedure will be described in greater detail. First, a network configuration procedure according to each communication protocol is explained, referring to FIGS. 8 to 10. Then, a service provision procedure after completing the network configuration is explained, referring to FIG. 12.

On the other hand, as described above, for each control device 110 and 120 to be connected to the home network, the home server 100 of the invention can provide both the DHCP and PPPoE mode according to the protocol supportable in the control devices 110 and 120. Thus, the network configuration procedures according to the DHCP mode, the PPPoE mode and the automatic IP configuration mode respectively are explained, referring to FIGS. 8 to 10.

Figure 8:
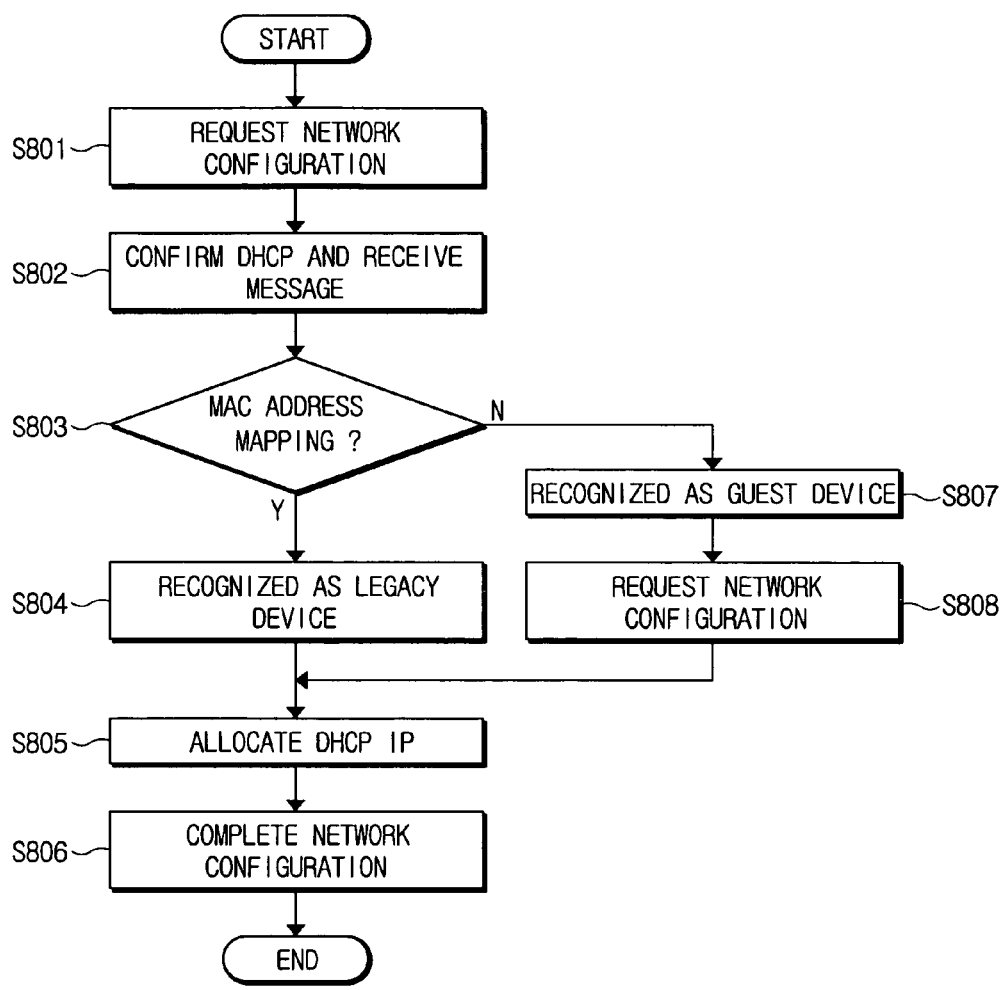
FIG. 8 is a flow chart showing a network configuration procedure according to the DHCP mode according to a first exemplary embodiment of the invention.

FIG. 8 is a flow chart showing a network configuration procedure according to the DHCP mode according to a first exemplary embodiment of the invention. Referring to FIG. 8, first, if a network configuration to the home server 100 is requested from the control device 110, 120 (S801), DHCP information is found through an incoming packet transmitted from the control device 110, 120 (S802) and network configuration is processed according to the DHCP protocol, as described above.

Here, as shown in FIG. 11A, the MAC address 1100 and the device ID 1110 of the control device are "M3" and "PDA", respectively (here, since the device is connected in the DHCP mode, the user ID 1120 and the password 1130 do not exist.). If the control device is registered with the authentication table as in Table 3 (S803), the control device is recognized as an existing home device, i.e., the legacy device 110 (S804) and is set up so as to enable the connection with the in-home devices and externally.

TABLE 3

| User ID | MAC Address | Device ID | IP | State |
|---------|-------------|-----------|-----|-------|
| Family  | M1          | PC_A      | I1  | On    |
| Parents | M2          | TV_A      | I2  | Off   |
| Child   | M3          | PDA_A     | I3  | On    |
| ...     |             |           |     |       |

Therefore, since the control device is a DHCP mode, a DHCP IP address is offered from the IP pool database 220. The IP address offered according to the DHCP IP address request is allocated to the control device, i.e., the legacy device 110 (S805), thereby successfully completing the network configuration (S806).

On the other hand, in a case where the MAC address of the control device is 'M3' and not registered with the authentication table as shown in Table 4 (S803), the control device is recognized as a new external device, i.e., a guest device 120 (S807), and a network configuration request to the home server 100 is made (S808).

TABLE 4

| User ID | MAC address | Device ID | IP | State |
|---------|-------------|-----------|-----|-------|
| Family  | M1          | PC_A      | I1  | On    |
| Parents | M2          | TV_A      | I2  | Off   |
| ...     |             |           |     |       |

At this time, the home server 100 may provide network configuration only, without registering the guest device 120 with the authentication table as exemplified in Table 4.

Thus, similar to the above description, since the control device is in the DHCP mode, a DHCP IP address is offered from the IP pool database 220 and the IP address offered according to the DHCP IP address request is allocated to the control device, i.e., the guest device 120 (S805), thereby successfully completing the network configuration (S806).

On the other hand, for example, if the guest device 120 wishes to operate in DHCP mode only, this device does not necessitate authentication. Thus, it may be configured such that a limited service such as the Internet is allowed, but access to various service devices 111 to 113 within the home network is not allowed. In addition, in a case where it is desirable that the Internet service is not allowed to the guest device 120, it can be interrupted through the bridging and routing table.

Figure 9:
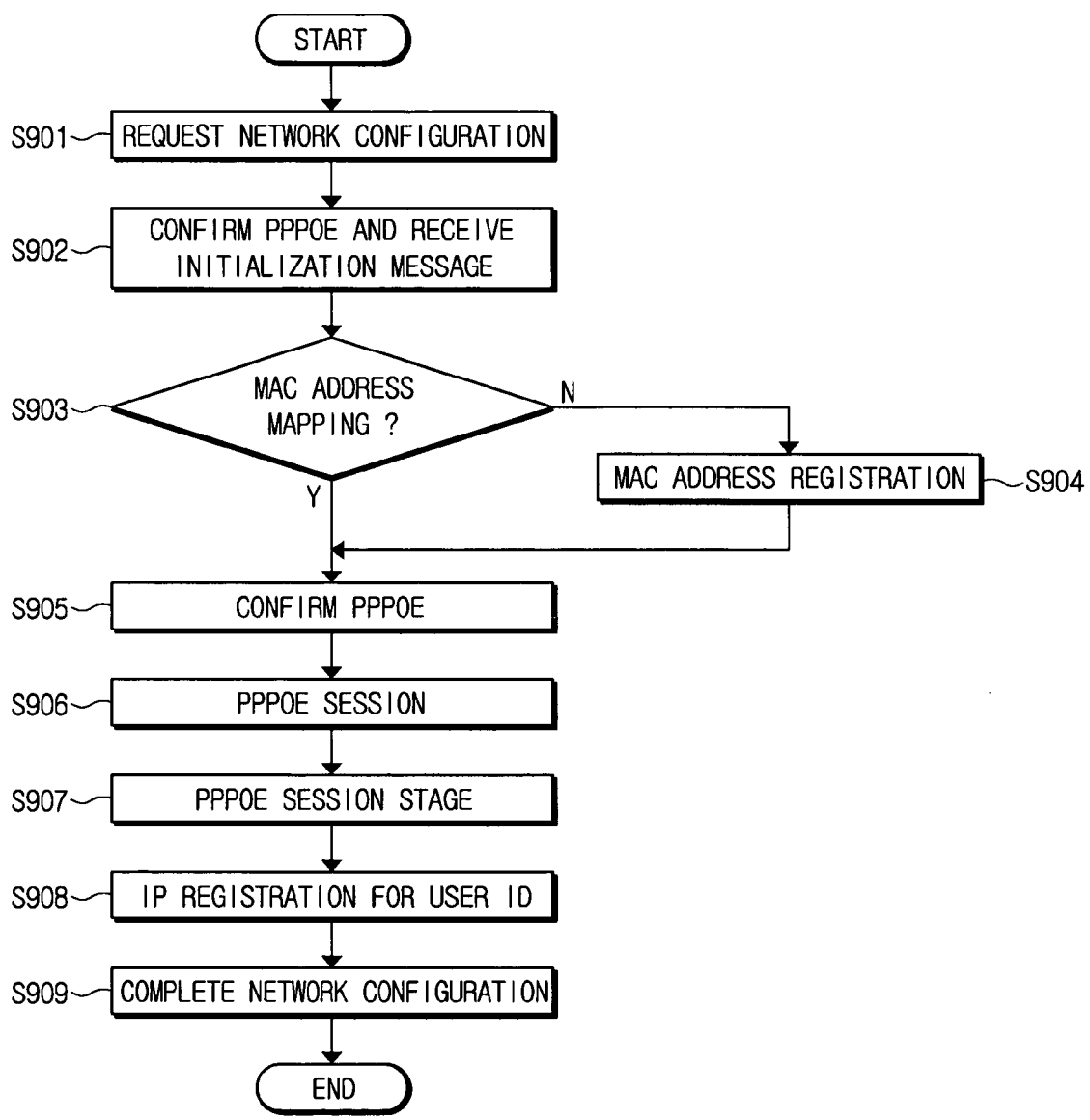
FIG. 9 is a flow chart showing a network configuration procedure according to the PPPoE mode according to a second exemplary embodiment of the invention.

FIG. 9 is a flow chart showing a network configuration procedure according to the PPPoE mode according to a second exemplary embodiment of the invention. Referring to FIG. 9, first, if a network configuration request is made to the home server 100 from the guest device 120 (S901), PPPoE is found through the incoming packet transmitted from the guest device 120 (S902) and, as described above, a network configuration is processed according to the PPPoE protocol.

Here, as shown in FIG. 11B, the MAC address 1100, the device ID 1110, the user ID 1140 and the password 1150 of the guest device are "M3", "PDA", "Guest2", and "**" (hidden state for protection), respectively. If the guest device is registered with the authentication table as shown in Table 5 (here, the IP address and state information is not registered) (S903), network configuration processing is performed for the guest device 120** according to the PPPoE protocol, without any additional MAC address registration processing.

TABLE 5

| User ID | MAC Address | Device ID | IP | State |
|---------|-------------|-----------|-----|-------|
| Family  | M1          | PC_A      | I1  | On    |
| Parent  | M2          | TV_A      | I2  | Off   |
| Guest 2 | M3          | PDA_A     | I3  | On    |
| ...     |             |           |     |       |

That is, as described above, since the guest device 120 is a PPPoE mode, the PPPoE daemon is executed (S905), the PPPoE session is executed (S906), and the PPPoE session stage is performed according to the PPPoE protocol (S907). (That is, the above mentioned PPP LCP, IPCP, PAP, CHAP, and the like are performed.)

Finally, a tunneling between the home server 100 and the guest device 120 is completed, and the IP address for the guest ID and the user ID is registered with the authentication table as shown in Table 5 (S908), thereby successfully completing the network configuration (S909).

On the other hand, as shown in FIG. 11B, the MAC address 1100, the device ID 1110, the user ID 1140 and the password 1150 of the guest device 120 are "M3", "PDA", "Guest2", and "**" (hidden state for protection) respectively. If the guest device is not registered with the authentication table as shown in Table 6 (S903), Table 6 is updated into Table 5 through an additional MAC address registration process (S904). That is, after the MAC address is first registered, network configuration processing is performed for the guest device 120** according to the PPPoE protocol.

TABLE 6

| User ID | MAC address | Device ID | IP | State |
|---|---|---|---|---|
| Family parents | M1 | PC_A | I1 | On |
| | M2 | TV_A | I2 | Off |
| ... | | | | |

Thus, at this time, similarly, since the guest device 120 is a PPPoE mode, the PPPoE daemon is executed (S905), the PPPoE session is executed (S906), and the PPPoE session stage is performed according to the PPPoE protocol (S907). That is, the above mentioned PPP LCP, IPCP, PAP, CHAP, and the like are performed.

Finally, a tunneling between the home server 100 and the guest device 120 is completed, and the IP address for the guest ID and the user ID is registered with the authentication table as shown in Table 5 (S908), thereby successfully completing the network configuration (S909).

Figure 10:
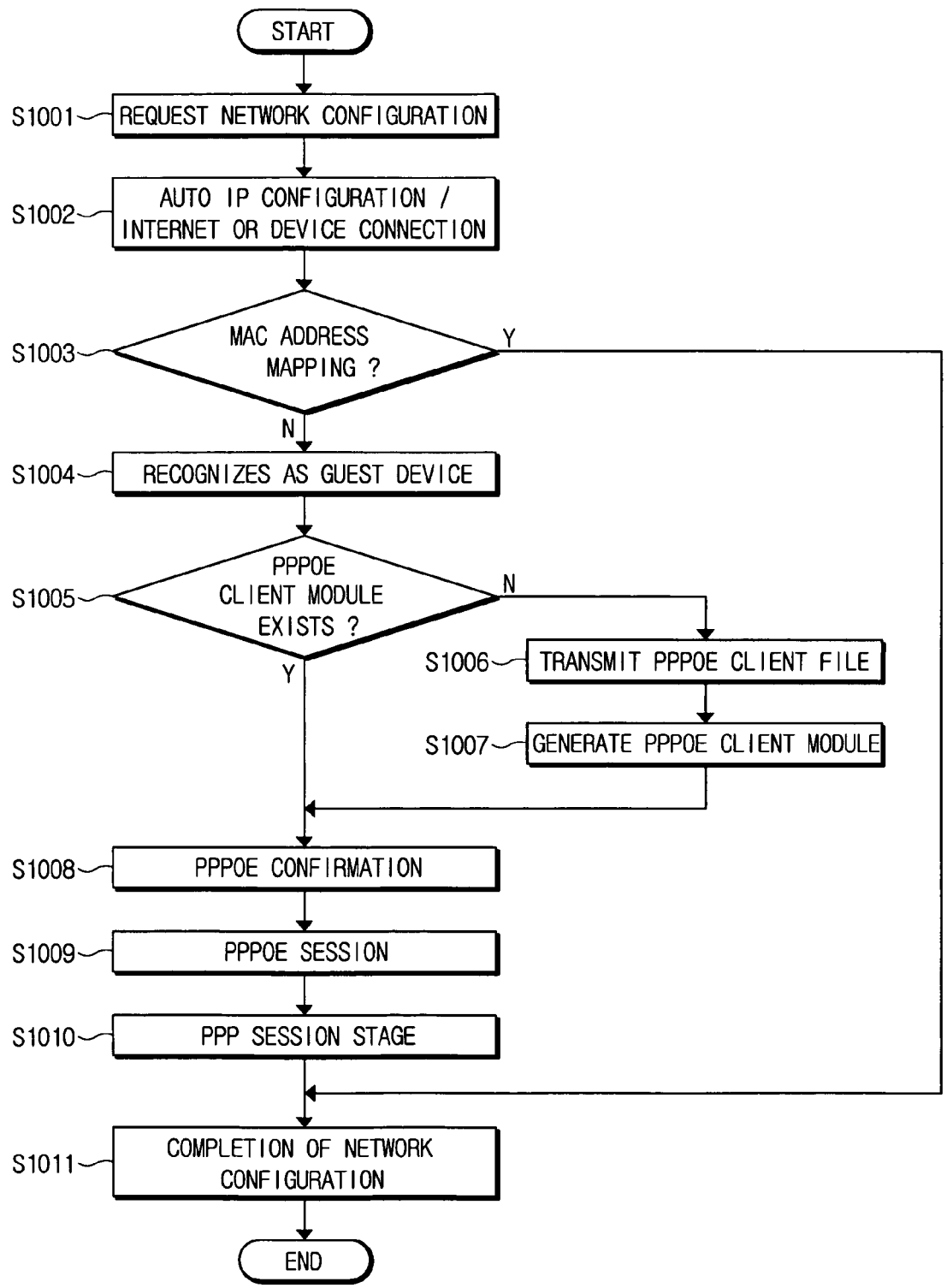
FIG. 10 is a flow chart showing a network configuration procedure when a device is accessed in an auto IP mode according to a third exemplary embodiment of the invention.

FIG. 10 is a flow chart showing a network configuration procedure when a device is accessed in an auto IP mode according to a third exemplary embodiment of the invention. Referring to FIG. 10, first, a network configuration request is made to the home server 100 from the control devices 110 and 120 (S1001). If the control device 110, 120 is an auto IP device, the network configuration procedure is performed according to the MAC address confirmation (S1003) and the PPPoE client module confirmation (S1005), which are described below.

At this time, as shown in FIG. 1B, the MAC address 1100, the device ID 1110, the user ID 1140 and the password 1150 of the control device 110, 120 are 'M3', 'PDA', 'Guest2', and '**' (hidden state for protection) respectively. If the control device is registered with the authentication table as shown in Table 7 (here, the IP address and state information are not registered) (SI 003), the control device is recognized as a legacy device 110 and network configuration processing is performed for the legacy device 110** (S1011), without any additional PPPoE processing.

TABLE 7

| User ID | MAC Address | Device ID | IP | State |
|---|---|---|---|---|
| Family | M1 | PC_A | I1 | On |
| Parent | M2 | TV_A | I2 | Off |
| Guest 2 | M3 | PDA_A | I3 | On |
| ... | | | | |

On the other hand, as shown in FIG. 11B, the MAC address 1100, the device ID 1110, the user ID 1140 and the password 1150 of the control device 110, 120 are "M3", "PDA", "Guest2", and "**" (hidden state for protection), respectively. If the control device is registered with the authentication table as shown in Table 8 (S1003), the control device is recognized as a guest device 120 and it is confirmed whether a PPPoE client module exists in the guest device 120** (S1005).

TABLE 8

| User ID | MAC Address | Device ID | IP | State |
|---|---|---|---|---|
| Family parents | M1 | PC_A | I1 | On |
| | M2 | TV_A | I2 | Off |
| ... | | | | |

As a result of the above confirmation, if a PPPoE client module exists in the guest device 120, the PPPoE daemon is executed (S1008), the PPPoE session is executed, and the PPPoE session stage is performed according to the PPPoE protocol (S1010). That is, the above mentioned PPP LCP, IPCP, PAP, CHAP, and the like are performed.

Finally, a tunneling between the home server 100 and the guest device 120 are completed, and the MAC address of the guest device 120, the user ID and the allocated IP address are registered with the authentication table as shown in Table 7. Thus, Table 8 is updated into a Table 7, thereby successfully completing the network configuration for the guest device 120 (S1011).

On the other hand, as a result of the above confirmation, if a PPPoE client module does not exist in the guest device 120, first a PPPoE client module is generated in the guest device 120 and thereafter the above network configuration procedure is carried out according to the PPPoE module. At this time, in order to generate a PPPoE client module with respect to the guest device 120, a PPPoE client file (for example, a PPPoE client binary file) for generating a PPPoE client module is transmitted from the host server 100 to the guest device 120 (S1006). At this time, the transmission may be carried out through a Java virtual machine (JVM). Then, the guest device 120 receives the PPPoE client-generating file and executes the received file to generate a PPPoE client module (S1007).

As described above, if a PPPoE client module is generated in the guest device 120, a network configuration procedure according to the PPPoE can be normally carried out with respect to the guest device 120.

That is, the PPPoE daemon is executed (S1008), the PPPoE session is executed, and the PPPoE session stage is performed according to the PPPoE protocol (S1010). That is, the above mentioned PPP LCP, IPCP, PAP, CHAP, and the like are performed.

Finally, a tunneling between the home server 100 and the guest device 120 is completed, and the MAC address of the guest device 120, the user ID and the allocated IP address are registered with the authentication table as shown in Table 7. Thus, Table 8 is updated into a Table 7, thereby successfully completing the network configuration for the guest device 120 (S1011).

As described above, each control device 110, 120 establishes a network configuration through the home server 100 according to each communication protocol. Hereafter, after the network configuration, a service provision procedure for the control devices 110 and 120 will be explained, referring to FIG. 12.

Figure 12:
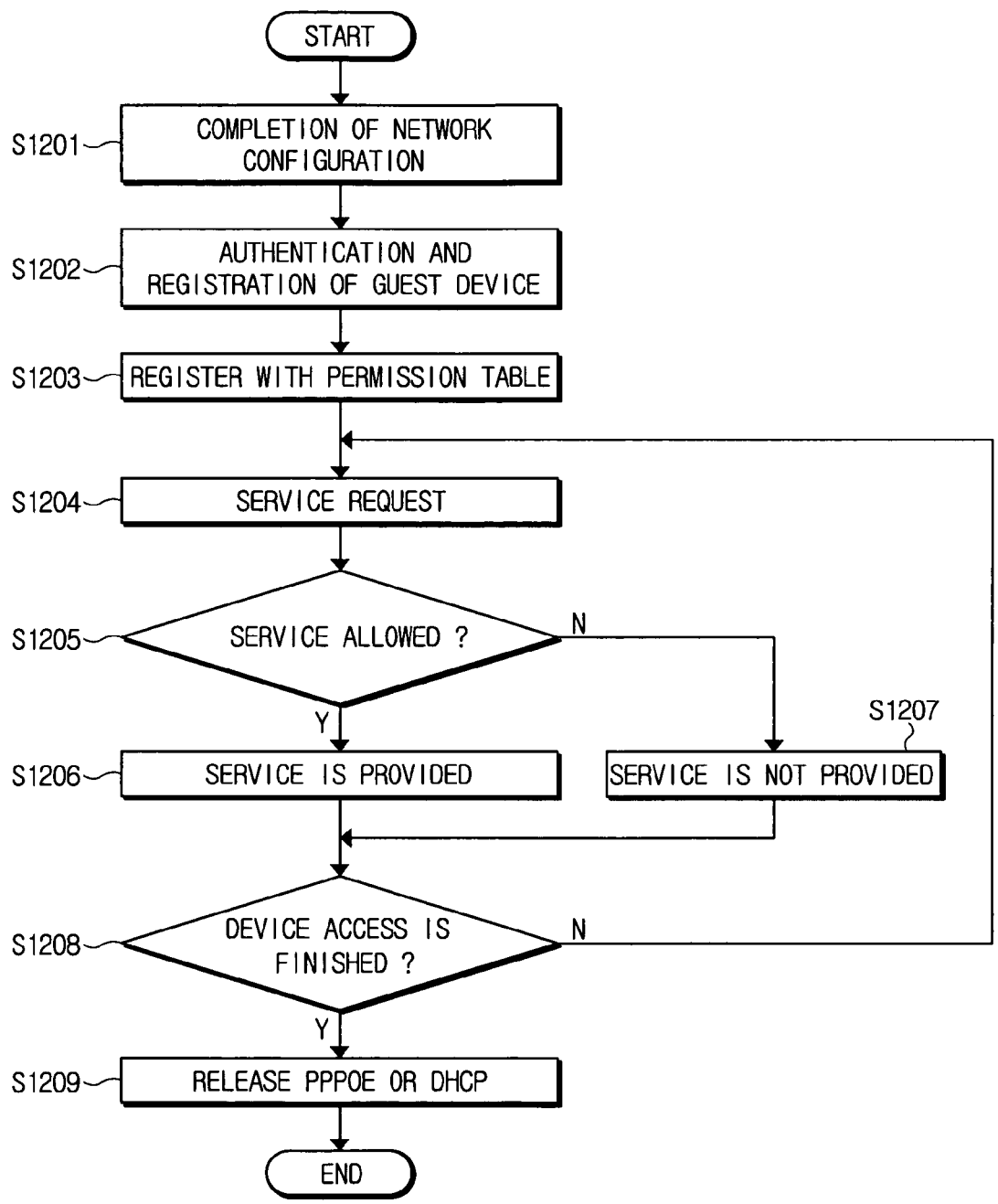
FIG. 12 is a flow chart explaining a service provision procedure for each device after the network configuration according to an exemplary embodiment of the invention.

FIG. 12 is a flow chart explaining a service provision procedure for each device after the network configuration according to an exemplary embodiment of the invention. Referring to FIG. 12, if the network configuration is finished (S1201) as described above, the authentication with respect to the guest device 120 is completed. Then, a registration procedure of the guest device 120 is performed (S1202).

On the other hand, the registration message for the above service may be prepared as an extensible Markup Language (XML) document, as follows.

```xml
<?xml version="1.0" ?>
<!DOCTYPE AAA SYSTEM "AAA.DTD" >
<AAA>
<ServicePermission>
<MessageType>Register</MessageType>
    <ServiceInfo>
       <activated ServiceType = ""/>
       <activated Servicenumber = ""/>
       <activated ServiceName = ""/>
    </ServiceInfor>
    <GuestDeviceInfo>
       <guestdeviceIdentity name="PDA_1"
          publicKeyToken="4c4996039ede" />
    </GuestDeviceInfo>
    <UserInfo>
       <User name="Guest2"/>
    </UserInfo>
    <ResultInfo>
       <Result ="none"/>
    </ResultInfo>
  </Register>
</ServicePermission>
</AAA>
```

In the above document, publicKeyToken="4c4996039ede" denotes the MAC address of the concerned control device 110, 120, and <UserInfo> means the user ID.

Accordingly, the permission information for the guest device 120 is registered with the permission table of the device and permission list database 131 included in the permission server 130 (S1203). For example, in a case where the IC of the guest device 120 is "Guest2", the MAC address thereof is "M3", and the user of the guest device 120 is underage, the guest device 120 may be registered as shown in the following Table 9.

TABLE 9

| ID | MAC Address | Permission information |
|---|---|---|
| Guest 1 | M1 | All permitted |
| Guest 2 | M3 | Just image & move & Internet & not adult |
| Guest 3 | M5 | Just device |
| Guest 4 | M6 | Just Internet |

After the permission table is registered, and if the guest device 120 makes a service request through the home server 100 (S1204), permission information is checked from the registered permission table and it is determined whether the request service is to be permitted. At this time, if the requested service is allowed (S1205), the service is provided (S1206). In contrast, if the service is not allowed, the requested service is not provided (S1207), and instead a service rejection message is transmitted.

Here, the service request message may be prepared as an XML document, as follows.

```xml
<?xml version="1.0" ?>
<!DOCTYPE AAA SYSTEM "BBB.DTD" >
<BBB>
<ServicePermission>
<MessageType>Request</MessageType>
    <ServiceInfo>
       <activated ServiceType = "ServiceMovie"/>
       <activated ServiceName = "Movie_Adult.mpg"/>
       <activated ServiceNumber = "8"/>
    </ServiceInfor>
    <GuestDeviceInfo>
       <guestdeviceIdentity name="PDA_1"
          publicKeyToken="4c4996039ede" />
    </GuestDeviceInfo>
    <UserInfo>
       <User name="Guest2"/>
    </UserInfo>
    <ResultInfo>
       <Result ="None"/>
    </ResultInfo>
  </Register>
</ServicePermission>
</BBB>
```

In the above document, <activated ServiceName="Movie_Adult.mpg"/> denotes a service contents requested by a concerned control device 110, 120, and <activated ServiceNumber="8"/> indicates a requested service number.

In addition, the permission message in response to the service request may be prepared as an XML document, as follows:

```xml
<?xml version="1.0" ?>
<!DOCTYPE BBB SYSTEM "CCC.DTD" >
<CCC>
<ServicePermission>
<MessageType>Request</MessageType>
    <ServiceInfo>
       <activated ServiceType = "ServiceMovie"/>
       <activated ServiceName = "Movie_Adult.mpg"/>
       <activated ServcieNumber = "8"/>
    </ServiceInfor>
    <GuestDeviceInfo>
       <guestdeviceIdentity name="PDA_1"
          publicKeyToken="4c4996039ede" />
    </GuestDeviceInfo>
    <UserInfo>
       <User name="Guest2"/>
    </UserInfo>
    <ResultInfo>
       <Result ="Allow"/>
    </ResultInfo>
  </Register>
</ServicePermission>
</CCC>
```

In the above document, <Result="Allow"/> indicates that the requested service is allowed.

On the other hand, when the requested service is finished (S1208), if the guest device 120 is a PPPoE mode, the PPPoE daemon is released and then the procedure is finished. If the guest device 120 is a DHCP mode, the DHCP daemon is released and then the procedure is finished (S1209).

Hereafter, a hardware or software exemplary embodiment of the home server 100 will be described, referring to FIGS. 13 and 14.

Figure 13:
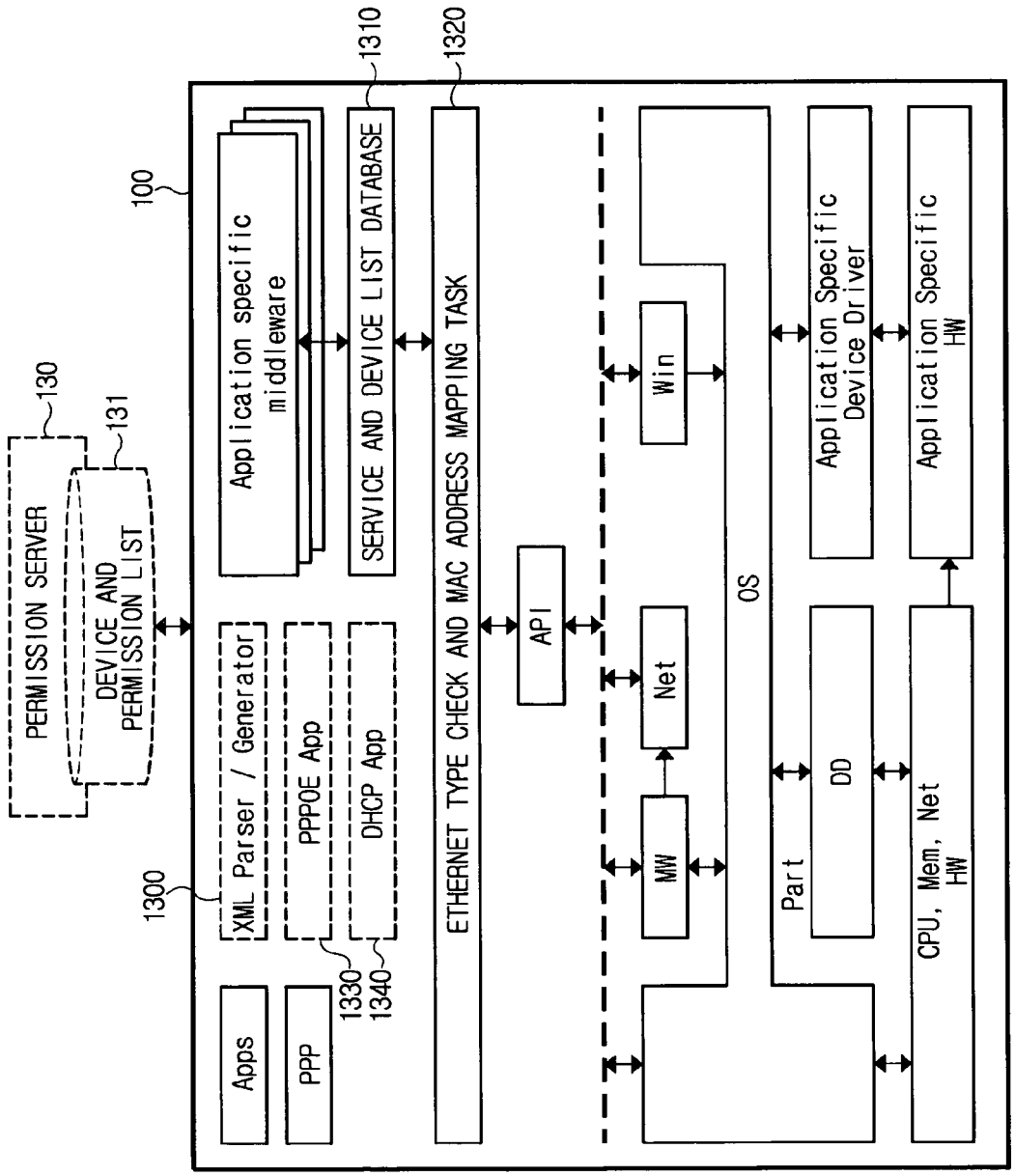
FIG. 13 is a block diagram illustrating a home server according to an exemplary embodiment of the invention.

FIG. 13 is a block diagram illustrating a home server according to an exemplary embodiment of the invention. Referring to FIG. 13, the home server 100 of the invention may be connected with a permission server 130 including a device and permission list database 131, or may include such a permission server 130.

On the other hand, the home server 100 is configured to include a PPPoE application 1330 and a DHCP application 1340 in order to perform a PPPoE server function and a DHCP server function simultaneously.

In addition, an XML parser/generator 1300 for generating a desired XML document is further provided in order to transmit and receive a permission and service request message from among the home server 100, the permission server 130 or the control devices 110 and 120.

Furthermore, as described above, in order to determine if the control device 110 or 120 is a PPPoE type packet or a DHCP type packet and perform an appropriate processing according to each packet type, an Ethernet type check and MAC address mapping task 1320 is provided. In addition, for authentication of the control devices 110 and 120, a service and device list database 1310 may be further provided.

Figure 14:
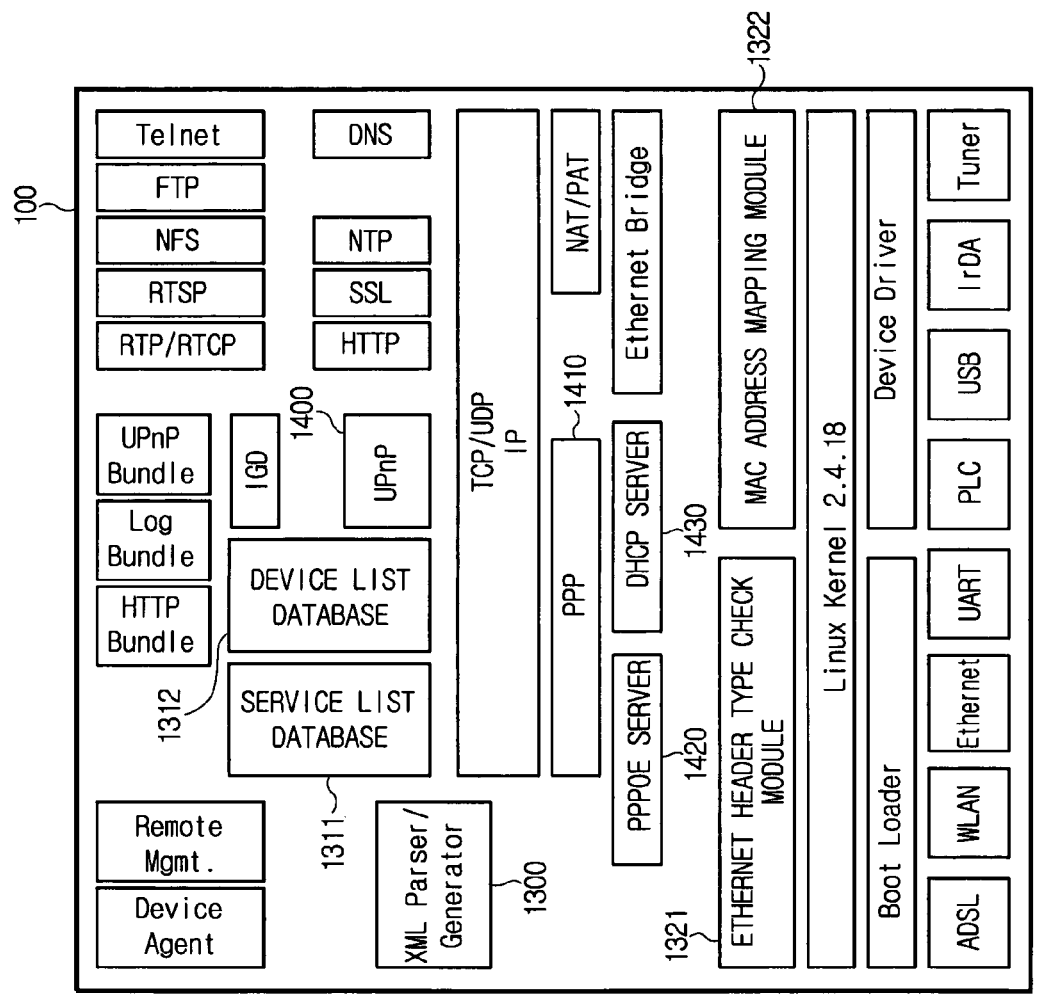
FIG. 14 is a block diagram showing detailed functions of a home server according to an exemplary embodiment of the invention.

FIG. 14 is a block diagram showing detailed functions of a home server according to an exemplary embodiment of the invention. That is, the specific device functions of the home server 100 in FIG. 13 can be represented as detailed function blocks in FIG. 14.

Referring to FIG. 14, the home server 100 of the invention includes, in addition to various devices of a conventional one, a UPnP 1400, a device list database 1312, a service list database 1311, an XML parser/generator 1300, a PPP 1410, a PPPoE server 1420, a DHCP server 1430, an Ethernet header type check module 1321, an MAC address mapping module 1322, and the like.

As described above, according to the invention, within the home network, authentication for a control device such as a legacy device or a guest device and a network configuration can be performed simultaneously.

In addition, according to the invention, access control to devices, services and contents are enabled. Also, a traffic priority provision is enabled, in which a network traffic priority can be provided with respect to each individual device and user.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A home server of a home network system comprising one or more devices, the home server containing authentication information for at least one control device, performing a network configuration for the at least one control device according to the authentication information, determining whether to allow a service provision requested by the at least one control device through a permission server which contains service permission information including a permission level for media contents set up differently according to characteristics of the respective control devices intended to control at least one service device, and providing the services to the respective control devices according to the service provision, wherein the permission level is set up differently for each of the media contents by providing the at least one service device according to the characteristics of the respective control devices, and wherein the home server simultaneously processes a dynamic host configuration protocol (DHCP) packet and a point-to-point protocol over Ethernet (PPPoE) packet from the respective control devices such that a network connection can be carried out, regardless of a communication protocol type of the respective control devices.

2. The home server as clamed in claim 1, performing authentication for the respective control devices using media access control address information of the control devices, or using a user identifier and password.

3. The home server as claimed in claim 1, simultaneously processing a user authentication, a device authentication and a network configuration for the control devices.

4. The home server as clamed in claim 1, comprising:
an Ethernet type check module which determines a data type of an incoming packet from the control devices having requested a network configuration;
a point-to-point protocol over Ethernet (PPPoE) server which performs PPPoE processing according to the data type determined by the Ethernet type check module;
a dynamic host configuration protocol (DHCP) server which performs DHCP processing according to the data type determined by the Ethernet type check module; and
a user and device authentication database which performs user and device authentication after the PPPoE processing and the DHCP processing.

5. The home server as clamed in claim 4, wherein the PPPoE server comprises:
a PPPoE daemon which performs processing in accordance with a PPPoE processing request;
a PPP daemon which performs processing in accordance with a PPP processing request, after the PPPoE daemon processing; and
a user authentication module which performs user authentication in the PPPoE, after the PPP daemon processing.

6. The home server as clamed in claim 4, wherein the DHCP server comprises:
a DHCP port number check module which checks a port number for a DHCP packet;
a DHCP daemon which performs processing in accordance with a DHCP processing request, after the DHCP port number is checked; and
a media access control (MAC) address authentication module which authenticates an MAC address of the DHCP packet, after the DHCP daemon is processed.

7. The home server as clamed in claim 4, wherein the Ethernet type check module determines through information recorded in Ethernet type information-containing field among data fields of the incoming data packet whether the incoming data packet is a DHCP packet or a PPPoE packet.

8. The home server as clamed in claim 7, wherein, if it is determined that the incoming data packet is the DHCP packet by the Ethernet type check module, Internet protocol (IP) packet information is determined from an IP packet area of a payload.

9. The home server as clamed in claim 7, wherein, if it is determined that the incoming data packet is the DHCP packet by the Ethernet type check module, user data protocol (UDP) information is determined from an IP packet area of a payload.

10. A permission server of a home network system comprising one or more devices, the permission server containing service permission information which includes a permission level for media contents set up differently according to characteristics of respective control devices intended to control service devices for providing the media contents, wherein the permission level is set up differently for each of the media contents by providing at least one service device according to the characteristics of the respective control devices, wherein the permission server is connected to a home server which performs a network configuration for the respective control devices according to the authentication information, and wherein the home server simultaneously processes a dynamic host configuration protocol (DHCP) packet and a point-to-point protocol over Ethernet (PPPoE)

packet from the respective control devices such that a network connection can be carried out, regardless of a communication protocol type of the respective control devices.

11. The permission server as claimed in claim 10, comprising a permission list database, which manages, in the form of a table, the service permission information according to the characteristics of the respective control devices.

12. The permission server as claimed in claim 11, wherein the permission list database comprises service device permission information.

13. A control device performing a network authentication through a home server, controlling at least one service device, and receiving a requested service content from the at least one service device according to whether the requested service content is allowed by a permission server, which contains service permission information which includes a permission level for services set up differently according to characteristics of respective control devices, when the respective control devices are connected to the permission server,
wherein the permission level is set up differently for each of the service contents, and the service content is provided from the at least one service device according to the characteristics of the respective control devices,
wherein the home server simultaneously processes a dynamic host configuration protocol (DHCP) packet and a Point-to-Point Protocol over Ethernet (PPPoE) packet from the control devices such that a network connection can be carried out, regardless of a communication protocol type of the respective control devices.

14. A method by which a home server authenticates a device, the method comprising:
receiving a network authentication request from control devices intended to control various service devices within a home network, and performing a network authentication;
if the network authentication is performed, receiving a request for media content provided by the service devices from the control devices;
in response to the request for the media content, determining whether a service provision, for providing the requested media content, requested by the control devices is allowed, through a permission server which contains service permission information which includes a permission level for media contents including the requested media content set up differently according to characteristics of the respective control devices; and
providing the requested media content according to whether the service permission is allowed,
wherein the permission level is set up differently for each of the media contents by providing at least one service device according to the characteristics of the respective control devices, and
wherein the home service simultaneously processes a dynamic host configuration protocol (DHCP) packet and a point-to-point protocol over Ethernet (PPPoE) packet from the respective control devices such that a network connection can be carried out, regardless of a communication protocol type of the respective control devices.

15. The method as claimed in claim 14, further comprising, if it is determined that the service provision is allowed:
selecting a matching protocol, port and format from among the home server, the control device, and the service device providing the requested service; and
updating a routing table and a bridging table between the control device and the service device.

16. The method as claimed in claim 14, wherein the home server performs a network authentication for the respective control devices using media access control address information of the control devices, or using a user identifier and password.

17. The method as claimed in claim 14, wherein the home server simultaneously processes a user authentication, a device authentication and a network configuration for the control devices.

18. The method as claimed in claim 14, wherein the home server simultaneously processes a dynamic host configuration protocol (DHCP) packet and a point-to-point protocol over Ethernet (PPPoE) packet from the control devices.

19. The method as claimed in claim 14, further comprising, if it is determined that the requested service is not allowed:
receiving a service permission reject message from the permission server; and
transmitting the reject message to the control device.

20. A method by which a permission server of a home network system comprising one or more devices authenticates a device, the method comprising:
receiving a request to determine whether to allow a service provision requested by control devices intended to control at least one service device for providing media contents, from a home server which manages the one or more devices;
determining whether to allow the service provision requested by the control devices according to service permission information which includes a permission level for the media contents set up differently according to characteristics of the respective control devices; and
transmitting a determination result to the home server,
wherein the permission level is set up differently for each of the media contents by providing the at least one service device according to the characteristics of the respective control devices, and
wherein home server simultaneously processes a dynamic host configuration protocol (DHCP) packet and a point-to-point protocol over Ethernet (PPPoE) packet from the respective control devices such that a network connection can be carried out, regardless of a communication protocol type of the respective control devices.

21. A method by which a control device for controlling at least one service device requests a service, the method comprising:
transmitting to a home server a request for a network authentication and media content; and
receiving a requested media content from the at least one service device according to whether the requested media content is allowed by a permission server, which contains service permission information which a permission level for media contents, including the requested media content, set up differently according to characteristics of respective control devices including the control device,
wherein the permission level is set up differently for each of the media contents according to the characteristics of the respective control devices, and
wherein home server simultaneously processes a dynamic host configuration protocol (DHCP) packet and a point-to-point protocol over Ethernet (PPPoE) packet from the respective control devices such that a network connection can be carried out, regardless of a communication protocol type of the respective control devices.

* * * * *